3,362,995
BENZIDENE BORON COMPLEX AND PROCESS
FOR PREPARING THE SAME
Guy Francais and Charles Horny, Chatillon-sous-Bagneux, France, assignors to Office National d'Etudes et de Recherches, Aerospatiales, Chatillon-sous-Bagneux, France, a French society
No Drawing. Filed Dec. 19, 1963, Ser. No. 331,972
Claims priority, application France, Dec. 21, 1962, 919,358
3 Claims. (Cl. 260—578)

The present invention relates to solid fuels and in particular to those having a hypergolic character with respect to some oxidizers such for instance as nitric acid, nitrogen peroxide, fluorine, or chlorine trifluoride. It is more especially concerned with such solid fuels intended for use in rocket engines of the fluid-solid type making use of a fluid oxidizer fed in a gradual manner into a combustion chamber wherein the solid fuel is housed, said fluid oxidizer being hypergolic with respect to said solid fuel, that is to say reacting therewith spontaneously when placed in contact therewith, without application of an external energy or without intervention of external means.

The chief object of the present invention is to provide a solid fuel of this type which is better adapted to meet the requirements of practice than those existing at the present time.

According to the present invention, whereas the components of the fuel comprise boron supplied in the form of diborane, carbon, hydrogen, and nitrogen, carbon being bonded to nitrogen but being not bonded with boron, and boron and nitrogen being bonded together and having a covalence equal to four, the carbon and nitrogen of the fuel are supplied in the form of an organic base consisting either of an aromatic amine or diamine, which may be a primary, secondary or tertiary one or of a hydrazine, for instance monosubstituted or disubstituted on the same nitrogen atom.

According to another feature of the invention, the method of preparing the fuel comprises dissolving, substantially at ordinary temperature but preferably slightly below this temperature, the organic base in a solvent which is not liable to react with diborane, this solvent being advantageously benzene, then placing in the presence of each other, still substantially at ordinary temperature and advantageously slightly below it, diborane, preferably diluted in dry nitrogen free from oxygen, and the solution prepared as above stated and finally separating the compound resulting from the reaction of diborane on said solution.

Organic bases suitable for making solid fuels according to the invention are the following ones:

paratoluidine, which is an aromatic primary monoamine,
dimethylaniline, which is an aromatic tertiary monoamine,
benzidine, which is an aromatic primary diamine,
phenylhydrazine, which is a monosubstituted hydrazine, and
1-1-dimethylhydrazine, which is disubstituted on the same nitrogen atom.

Concerning the separation of the compound, it may be effected by a mere mechanical action when said compound is little soluble in the above mentioned solvent.

On the contrary, when said compound has a substantial solubility in the solvent, it is separated therefrom by concentration in vacuum at low temperature, followed by a mechanical action.

Anyway the product that is obtained, if solid, is advantageously agglomerated under pressure, for instance under a pressure ranging from 50 to 1000 kg./cm.², at an ordinary or moderate temperature compatible with the stability of the product. It should be noted that the agglomeration of the product may be preceded by a thermal treatment under ordinary or reduced pressure. Experience taught that, in some cases, this heating stabilizes the substance and gives it an improved thermal behaviour.

In order to improve the mechanical qualities of the product, several treatments may be used, to wit:

The incorporation, previous to agglomeration, of a binder which does not react at the temperature where agglomeration is conducted, with the hypergolic substance obtained, for instance cellulose triacetate, polyvinyl chloride, polyethylene and "Stratyl," which is a trademark relating to a mixture of a polyester and styrene, used together with a suitable catalyst, such as sodium borohydride, in the proportion of from 3 to 15%, this addition being effected by intimately mixing together the active substance and the binder, both in the form of fine powders. Stratyl may also be used in the solid form; or The incorporation of a binder such for instance as an elastomer intended to increase the mechanical resistance of the block, the percentage of elastomer being at most 5% when the agglomeration is to be effected under high pressure and in a relatively hot state, compatible with the stability of the product.

Such an incorporation of elastomer can be performed for instance by intimately mixing the fuel product in a solution of the elastomer, for instance in a solution of natural rubber in benzene, then evaporating the solvent under reduced pressure.

If it is desired to increase the proportion of the elastomer, for instance if it is to be brought to a value averaging 50%, the fuel product may be mixed directly with the elastomer (natural rubber for instance), this mixing being performed by calendering by means of two cylinders rotating at the same speed and from natural gum sheets. The ribbon thus obtained can then be wound about a mandrel in order to give the product the desired shape.

What has been said concerning the preparation of the solid fuels from the definite compounds according to the invention may apply to mixtures of said definite compounds provided that they do not react together.

We will now give examples of the invention, it being well understood that the numerical concentrations and relative proportions in these examples might be varied within relatively wide limits.

*Example I*

A solution is prepared from 107 gr. (1 mole) of paratoluidine and 1,000 cm.³ of benzene (toluene may also be used). In this solution 14 gr. (½ mole) of diborane are passed slowly, that is to say within a time of the order of one hour, this diborane being mixed with dry nitrogen, free from oxygen. The temperature is just a little below ordinary temperature, i.e. from 5 to 10° C. A precipitate is formed. It is mechanically freed from liquid, washed with a little amount of benzene which is eliminated under reduced pressure, after which the precipitate is allowed to dry in the atmosphere or, preferably, in a relative vacuum, for some hours, until its weight no longer varies. We obtain 59 gr. of a product consisting of fine white needles the smell of which is analogous to that of paratoluidine but not to that of boron hydride.

This product consists of paratolyl borazane. It can be agglomerated merely by being compressed, for instance under a pressure of 200–850 kg./cm.², to form a lithergol having a sufficient mechanical resistance and adapted to work with an oxidizer consisting of nitric acid.

This product, which contains 8.94% of boron, is formed with a yield, with respect to each of the reagents, of 48%. It is stable at least up to 80° C., and decomposes at temperatures higher than this value with a liquefaction and an evolution of diborane.

According to a first modification, paratoluidine is replaced by its meta isomer, the method of preparation being otherwise the same. The product that is obtained is in the form of white crystals and it is not as stable as the preceding one. The yield of the operation has been found to be only 30%.

According to a second and a third modification, paratoluidine is replaced by orthotoluidine or an equimolecular amount of aniline, the products that are obtained still containing boron but having a lower affinity for the oxidizers.

*Example II*

40.3 gr. of N-dimethylaniline (⅓ of a mole) are dissolved in 200 cm.³ of benzene (cyclohexane may also be used). ⅙ of a mole of diborane, preferably mixed with dry and oxygen free nitrogen, is made to flow through this solution. When the absorption ceases, the benzene solution is concentrated in a vacuum and by cooling down at a temperature of about 8° C. crystals are obtained.

If the crystals that are obtained have the following formula $$C_6H_5-N(CH_3)_2BH_3$$

the yield is 86% and hydrolysis must produce, per gram, 4,977 cm.³ of hydrogen. It was found that this amount is truly evolved with a margin of error of two percent. The product obtained, which melts at 35° C., is highly hypergolic for instance with fuming nitric acid. It remains so after having been heated for twenty minutes at 140° C.

*Example III*

12.9 gr. of benzidine, i.e. of pp′ diamino-biphenyl, that is to say about 0.07 mole (M=184) are dissolved in 700 cm.³ of benzene. Diborane, advantageously mixed with dry and oxygen free nitrogen, is passed through this solution and quickly produces the formation of white crystals which, after washing and drying, have a weight of 14.8 gr. The yield reaches 77% and the percentage of boron, which is close to 10% seems to indicate that a $BH_3$ group is fixed upon each of the two nitrogen atoms.

*Example IV*

A solution of pure phenylhydrazine (M=108) in benzene is subjected to the action of diborane, in the presence of nitrogen. We collect colorless crystals which undergo no alteration in air at ordinary temperature. For a single $BH_3$ fixed, the boron percentage would be 8.87%. For two $BH_3$ it would reach 15.91%. The actual boron percentages vary very much according to the concentration of the solution that has been used and also according to the ratio of diborane to phenylhydrazine. They may be lower than 8.87 and even slightly higher than 15.91%.

It is supposed that two products containing respectively one and two boron atoms are formed simultaneously and that, according to the circumstances, either of them preponderates. Furthermore they may syncrystallize with phenylhydrazine (the melting point of which is 19° C.) and also fix by adsorption a slight excess of diborane.

*Example V*

25.5 gr. of 1-1-dimethylhydrazine (M=60) are dissolved in 250 cm.³ of benzene. The solution being kept at a temperature ranging from 5° to 10° C., diborane is caused to flow therethrough (this diborane being preferably mixed with dry oxygen free nitrogen) until any absorption ceases. In these conditions the product that is formed in a preponderating manner, and which is also the less soluble in benzene, is that resulting from the addition of one molecule of diborane to one molecule of dimethylhydrazine. This compound theoretically contains 24.64% of boron. The crystals that are obtained in the present example contain 24.5% of boron. As they weigh 30.7 gr., it is deduced therefrom that the yield is equal to 82%.

This dimethyl hydrazine diborane complex, which is highly hypergolic with, for instance, fuming nitric acid and, of course, with chlorine trifluoride, is a little soluble in benzene (1.66 gr. in 100 cm.³ of pure benzene at 20° C.). In water, its solubility is not zero. In methanol, it is very important and these two last mentioned substances (water and methanol) produce in the cold state but a small evolution of hydrogen.

Placed in a thermostatic bath, without special precaution, the dimethyl hydrazine diborane complex undergoes no alteration as long as the temperature of the bath does not exceed 76° C. When the temperature exceeds this value, the inner temperature of the complex is slightly above that of the bath. Sometimes, at temperatures ranging from 88° to 90° C., there is a rather violent, but not explosive, reaction. A melting of the complex and an evolution of a gas consisting of diborane then take place.

This complex, which is in the state of a crystalline powder, cannot be agglomerated by mere compression so as to form a lithergol: It is necessary to add thereto a binder which may consist for instance of cellulose triacetate, polyvinyl chloride, polyethylene or Stratyl, these binders being in the powder state and their percentage ranging from 5 to 15.

It is also possible to constitute the solid fuel by a mixture of dimethyl hydrazine diborane and paratolyl borazane and to form it by mere compression, provided that the percentage of paratolyl borazane is at least 5%. Such a fuel has been made with 50% of each of the above mentioned bodies.

If it is desired to avoid decomposition of the dimethyl hydrazine diborane at temperature ranging from 88° to 90° C., it is necessary to heat it at a temperature of about 80° C., during a time sufficient so that a sample does not give rise, between 88° and 90° C., to the above mentioned decomposition. This time depends upon the mass that is treated, and, by way of indication for the amount referred to, the necessary time of heating has been one hour.

This heating is advantageously performed while the product is still inside the benzene where it has been formed, the temperature being slightly lower than, or equal to, the boiling point of benzene. In the latter case, the operation is effected with reflux while stirring.

It is supposed that dimethyl hydrazine diborane has the following formula

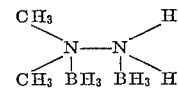

and that heating at about 80° transforms it at least partly into a product of the following formula

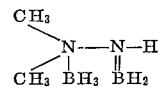

This new substance keeps the hypergolic character and the initial amount of boron existing in the complex before heating. It may be heated up to 100° C., and even above this temperature, without melting or evolving diborane.

The product thus obtained may be mixed with a suitable binder and for instance with the binders above mentioned, i.e., cellulose triacetate, polyvinyl chloride, polyethylene and Stratyl.

In a general manner, while we have in the above description disclosed that we deem to be practical and efficient embodiments of the present invention, it should be well understood that we do not wish to be limited thereto as there might be changes made in the arrangement, disposition and form of the parts without departing from the principle of the present invention as comprehended within the scope of the appended claims.

What we claim is:

1. A process for preparing a benzidene borane complex comprising dissolving benzidene in benzene, passing diborane through said benzidene solution to produce said complex as a precipitate, and separating said precipitate from said solution.

2. The method of claim 1 wherein said diborane is diluted with dry oxygen-free nitrogen.

3. The complex produced by the method of claim 1.

References Cited

UNITED STATES PATENTS

| | | | |
|---|---|---|---|
| 2,675,409 | 4/1954 | Orloff et al. | 260—579 |
| 3,125,603 | 3/1964 | Koster | 260—583 |
| 3,153,671 | 10/1964 | Ashley | 260—583 |
| 3,135,635 | 5/1964 | Logan et al. | 149—22 |
| 3,138,602 | 5/1964 | Szymanski et al. | 149—22 |
| 2,992,061 | 7/1961 | Fleming | 260—569 X |

FOREIGN PATENTS

| | | |
|---|---|---|
| 1,048,586 | 1/1959 | Germany. |
| 1,068,231 | 11/1959 | Germany. |

OTHER REFERENCES

Jones et al., "Jour. Amer. Chem. Soc.," vol. 75, p. 756 (1953).

Mikheeva et al., "Chemical Abstracts," vol. 51, p. 17561 (1957).

Mikheeva et al., "Doklady Akad. Nauk. S.S.S.R.," vol. 131, pp. 318–20 (1959).

CHARLES B. PARKER, *Primary Examiner.*

REUBEN EPSTEIN, *Examiner.*

L. A. SABASTIAN, R. V. HINES, *Assistant Examiners.*